Figure 1:
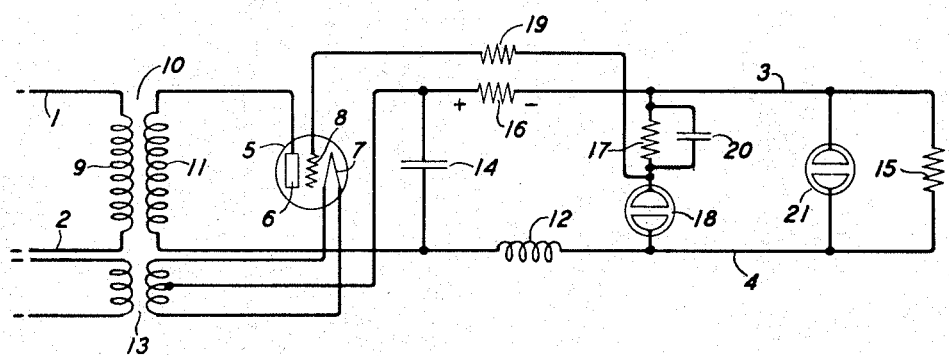

March 30, 1943.    L. E. MILARTA    2,315,445
REGULATED RECTIFIER CIRCUIT
Filed Aug. 31, 1940

INVENTOR
L. E. MILARTA
BY
Wayne B Wells
ATTORNEY

Patented Mar. 30, 1943

2,315,445

UNITED STATES PATENT OFFICE 2,315,445

REGULATED RECTIFIER CIRCUIT

Louis E. Milarta, Hollis, N. Y., assignor to Bell Telephone Laboratories, Incorporated, New York, N. Y., a corporation of New York Application August 31, 1940, Serial No. 354,953

5 Claims. (Cl. 175—363)

This invention relates to regulated rectifier circuits and particularly to regulated rectifier circuits for supplying substantially constant current.

One object of the invention is to provide a regulated rectifier circuit between an alternating current supply circuit and a direct current load circuit that shall maintain the load current substantially constant while limiting the voltage on the load circuit.

Another object of the invention is to provide a regulated rectifier circuit comprising a three-element gas-filled tube connected between an alternating current supply circuit and a direct current load circuit that shall control the bias on the grid of the tube according to the load current to maintain the load current constant and that shall control the grid of the tube in case the load circuit voltage go above a predetermined value to block the tube.

A further object of the invention is to provide a regulated rectifier circuit comprising a three-element gas-filled tube connected between an alternating current supply circuit and a direct current load circuit that shall control the grid bias on the tube according to the potential drop across a resistance in series with the load circuit and that shall control the bias on the tube grid according to the potential drop across a resistance connected in series with a cold cathode tube across the load circuit to block the rectifier tube when the load voltage rises to a predetermined value.

In many types of circuits it is desirable to supply a direct current load circuit with rectified current from an alternating current supply circuit while maintaining the load circuit current substantially constant. In such types of circuits it is also desirable to insure that the load circuit voltage does not go above a predetermined value.

In a regulated rectifier constructed in accordance with the invention a rectifier which is connected between an alternating current supply circuit and a direct current load circuit is controlled in accordance with the load circuit current to maintain the load current substantially constant. Furthermore, means are provided to block the rectifier in case the load circuit voltage rises to a predetermined value.

In accordance with the invention a three-element gas-filled tube is connected between an alternating current supply circuit and a direct current load circuit. The plate and filament of the gas-filled tube are connected in series between the secondary winding of a transformer in the supply circuit and the load circuit. The potential drop across a resistance element in series with the load circuit is employed for impressing a negative bias on the grid of the gas-filled tube. The bias impressed on the grid of the gas-filled tube serves to vary the point in a half cycle at which the tube ignites so that the load circuit current may be maintained substantially constant. A second resistance element in series with a cold cathode tube is connected across the load circuit for supplying a negative bias to block the gas-filled rectifier tube in case the voltage on the load circuit rises to a predetermined value.

The regulated rectifier circuit is protected against excessive voltage on the load circuit in case of an open circuit on the load circuit and against excessive current flow in case of a short circuit on the load circuit. The second resistance element connected in series with the cold cathode tube across the load circuit impresses sufficient negative bias on the grid of the rectifier tube to block the tube whenever the cold cathode tube ignites. The cold cathode tube ignites whenever a dangerous voltage obtains on the load circuit. In case of a short circuit on the load circuit the first resistance element impresses sufficient negative bias on the grid of the rectifier tube to insure against excessive current flow. The first resistance element may even block the tube in case of short circuit conditions on the load circuit.

Figure 2:
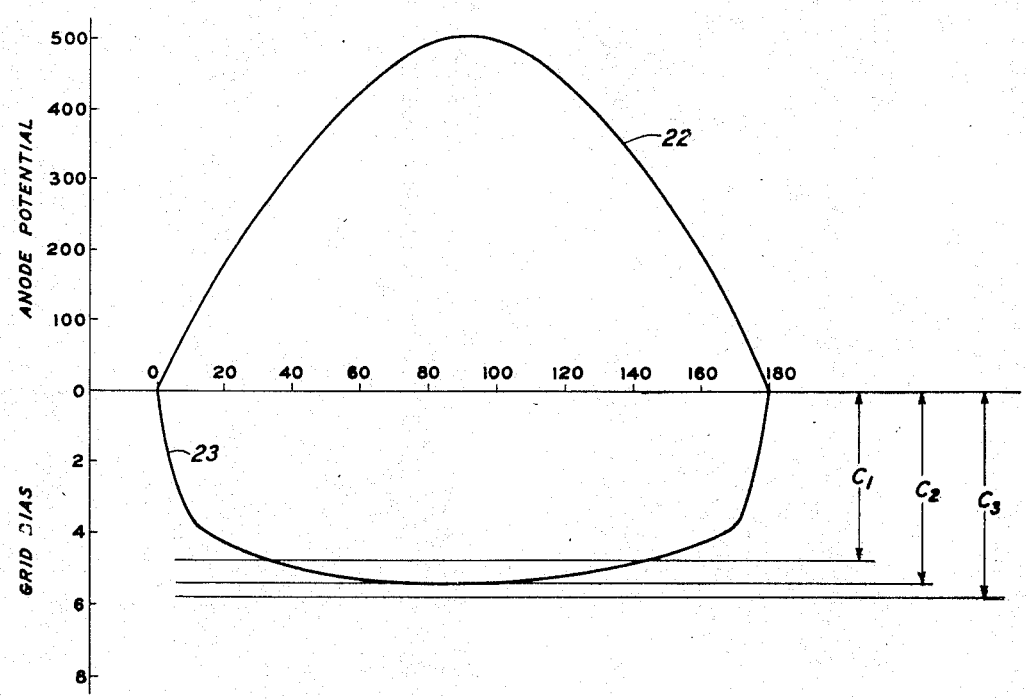

In the accompanying drawing:

Fig. 1 is a diagrammatic view of a regulated rectifier circuit constructed in accordance with the invention; and Fig. 2 is a diagrammatic view illustrating the ignition of the rectifier tube shown in Fig. 1 under various operating conditions.

Referring to Fig. 1 of the drawing, an alternating current supply circuit comprising conductors 1 and 2 is provided for supplying regulated rectified current to a load circuit comprising conductors 3 and 4. A gas-filled three-element rectifier tube 5 is provided between the supply circuit and the load circuit for rectifying the alternating current. The rectifier tube 5 comprises an anode 6, a cathode 7 and a control grid 8. The supply circuit conductors 1 and 2 are connected to the primary winding 9 of a transformer 10. A secondary winding 11 has one terminal connected to the anode 6 and the other terminal connected through an inductance 12 to the load conductor 4. An auxiliary transformer 13 is provided for heating the cathode 7 of the gas-filled tube 5. A condenser 14 which is connected across the load circuit adjacent to the gas-filled tube 5 cooperates with the inductance 12 for smoothing out ripples in the rectified current. The load on the load conductors is indicated by a resistance 15.

A resistance element 16 is inserted in series with the load circuit for impressing a negative bias on the grid 8 which varies according to the load circuit current. The potential drop across the resistance 16 so controls the potential on the grid 8 and the ignition point of the gas-filled tube 5 as to maintain the load circuit current substantially constant. Preferably, the current on the load circuit in the regulated rectifier under consideration is in the neighborhood of 20 milliamperes. A second resistance element 17 is connected in series with a cold cathode tube 18 across the load conductors 3 and 4. The potential drop across the resistance element 17 when the tube 18 is ignited is employed to impress a blocking bias on the grid 8 of the gas-filled tube 5. The cold cathode tube 18 is adjusted to ignite whenever a limiting voltage is impressed on the load circuit. The grid circuit for the gas-filled tube 5 may be traced from the grid 8 through an adjusting resistance 19, resistance 17, resistance 16, mid-point of the secondary winding of the transformer 13 and cathode 7. A condenser 20 is connected across the resistance element 17 to sustain the bias impressed by the potential drop across the resistance 17 for a period of time. In brief, the condenser 20 acts as a hang-over in the operation of the voltage limiting feature of the load circuit. A second cold cathode tube 21 is connected across the load conductors to insure complete suppression of excessive transient peak voltage under open circuit conditions. Transient peak voltages may occur when the load circuit is opened by reason of the inductive discharge from the coil 12 and because there may be a delay of one cycle in the blocking of the tube 5.

The curves shown in Fig. 2 of the drawing indicate the operation of the regulated rectifier circuit shown in Fig. 1 of the drawing. The curve 22 indicates a half wave supplied by the transformer 10 which is rectified by the gas-filled tube 5. The curve 23 indicates the critical grid voltage. Three grid voltages, indicated by the reference characters $C_1$, $C_2$ and $C_3$, have been shown to illustrate the grid voltage under normal operating conditions, the grid voltage in the neighborhood of short circuit condition on the load circuit and the grid voltage when the load circuit voltage approaches or is in the neighborhood of the limiting value. When a bias $C_3$ is impressed on the grid 8 it is apparent that the tube 5 is blocked to prevent any flow of current. A bias in the neighborhood of that indicated by $C_3$ will be impressed on the grid 8 whenever the cold cathode tube 18 is ignited. In case a short circuit is made on the load circuit the bias on the grid 8 will be raised to the value $C_2$ and prevent excessive current flow or block the gas-filled tube. Under normal operating conditions the grid voltage is in the neighborhood of $C_1$. It is evident from the critical grid voltage curve that small changes in grid bias will result in large changes in the passage of current through the gas-filled tube to maintain substantially constant current on the load circuit.

Modifications in the circuit and in the arrangement and location of parts may be made within the spirit of the invention and such modifications are intended to be covered by the appended claims.

What is claimed is:

1. In combination, an alternating current supply circuit, a direct current load circuit, a three-element gas-filled tube having the cathode and anode connected in series between said circuits, a first resistance element connected in series with the load circuit, a second resistance element connected in series with a cold cathode tube across the load circuit, means for impressing a negative potential on the grid of said tube according to the potential drop across said first resistance to maintain the load current constant irrespective of variation in the load circuit impedance, and means upon ignition of said cold cathode tube when the load voltage reaches a predetermined value for impressing the potential drop across said second resistance on the grid to block the tube.

2. In combination, an alternating current supply circuit, a direct current load circuit, a three-element gas-filled tube having the cathode and anode connected in series with said circuits, a first resistance element connected in series with the load circuit, a second resistance element connected in series with a cold cathode tube across the load circuit, and means for connecting the grid of said gas-filled tube in series with said resistance elements to the gas-filled tube cathode to maintain substantially constant current on the load circuit irrespective of variation in the load circuit impedance while preventing the load circuit voltage going above a predetermined value.

3. In combination, an alternating current supply circuit, a direct current load circuit, a three-element gas-filled tube having the cathode and anode thereof connected between said supply and load circuits, means comprising a resistance in series with said load circuit for impressing a negative bias on the grid of said tube according to the load current to maintain the load current substantially constant irrespective of variation in the load circuit impedance, and means comprising a resistance connected in series with a cold cathode tube across the load circuit for impressing a blocking negative potential on the grid of said gas-filled tube, the breakdown potential of the cold cathode tube exceeding the normal load circuit potential of the direct current load circuit whereby current passes through the cold cathode tube only when the load circuit voltage rises to a predetermined limiting value and the cold cathode tube ignites.

4. A current supply system comprising a source of electric current, a load circuit and a triode electron discharge device having a cathode-anode path connected electrically in series with the source and the load circuit, the triode device being of such type that the energy passed by its cathode-anode path may be varied by varying the biasing potential on its third electrode with respect to the cathode, means connected in series with the load circuit and also connected to the third electrode to impress a biasing potential on the third electrode to hold substantially constant the current delivered to the load irrespective of variation in the load circuit impedance, and means connected in shunt to the load circuit and also connected to the third electrode to impress a biasing potential thereon only when the potential impressed across the load circuit exceeds a predetermined safety limit to effectively block passage of current through the cathode-anode path of the triode to protect the load circuit against potentials exceeding the safety limit which might injure apparatus connected across the load circuit.

5. The combination of claim 4, characterized in this that there is also provided means responsive only to potentials in excess of the safety limit to absorb excessive transient voltages which might develop across the load circuit when the current through the triode is blocked.

LOUIS E. MILARTA.